Jan. 3, 1933.  J. BRIDGES  1,893,134
PYROMETER ADAPTED TO THE CONTROL OF TEMPERATURE
Filed Feb. 3, 1930
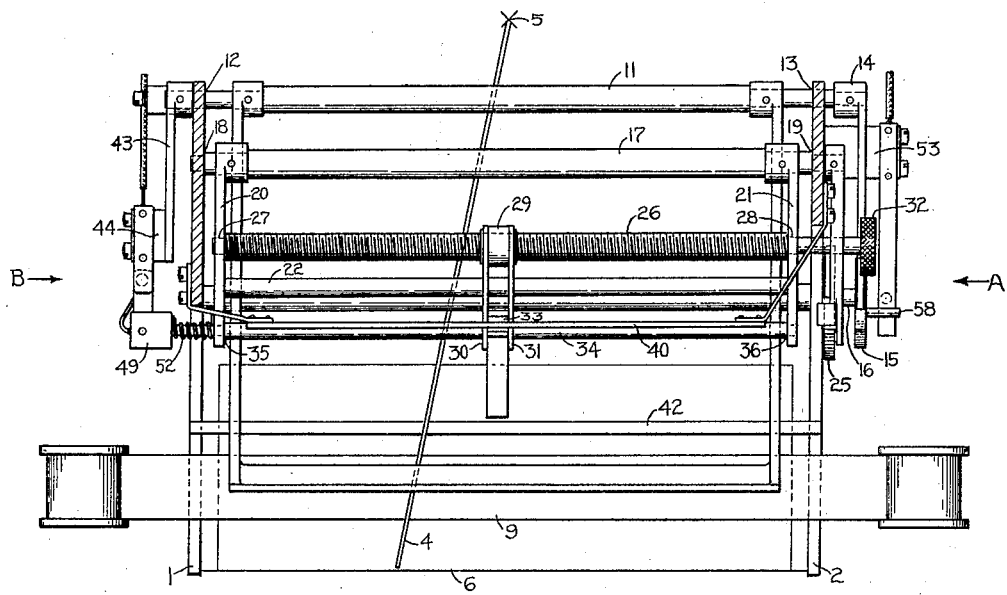
Fig.1.
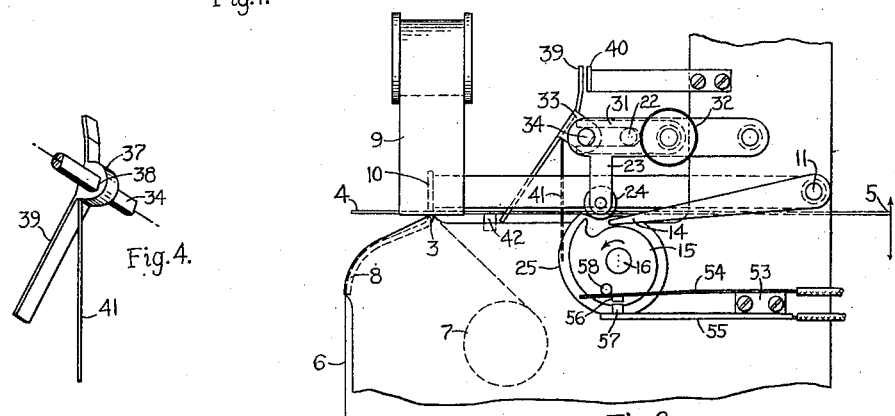
Fig.4.
Fig.2.
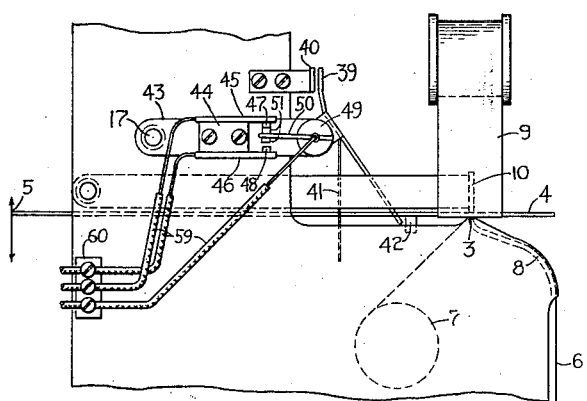
Fig.3
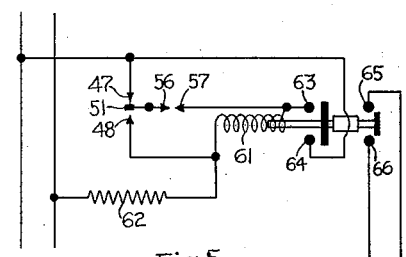
Fig.5.
Inventor
James Bridges
per James B Lewis
Attorney Patented Jan. 3, 1933

1,893,134

UNITED STATES PATENT OFFICE

JAMES BRIDGES, OF LONDON, ENGLAND, ASSIGNOR TO REPUBLIC FLOW METERS COMPANY, OF CHICAGO, ILLINOIS, A CORPORATION OF ILLINOIS

PYROMETER ADAPTED TO THE CONTROL OF TEMPERATURE

Application filed February 3, 1930, Serial No. 425,612, and in Great Britain April 12, 1929.

This invention relates to temperature control apparatus of the type wherein mechanism, periodically operated by an auxiliary power, co-operates with the temperature responsive index of a pyrometer measuring a temperature to be controlled, and is adapted to engage this index if it has moved beyond a certain point in response to the temperature passing beyond a certain value, such engagement effecting change in the heating quantities supplied. The invention is particularly applicable to recording pyrometers of the thermo-electric type and to other types of recording pyrometers wherein the deflection of a galvanometer provides a measure of temperature, in which the index is normally free to take up its position, according to the temperature, over an inked marking ribbon or thread which is located over the record chart, but is periodically depressed by an auxiliary mechanism so as to mark the chart by forcing the marking ribbon into contact therewith. In adapting such pyrometers to the control of temperature it is thus necessary for the index to be acted upon by two periodically operating mechanisms, one for the purpose of marking the chart and one for the purpose of temperature control. As it is impracticable for both mechanisms to be arranged to act on the index at the same point it has not hitherto been possible to secure proper support for the index to resist the forces exerted by the action of both mechanisms and a couple is exerted on the index, tending to damage the pivots of the pyrometer movement. An object of the present invention is to provide means whereby a relatively large operating force may be exerted by the periodically operating mechanism without exerting such a couple on the index. Another object of the invention is to provide an improved mechanism for the control of temperature operating from a sensitive temperature responsive index.

The following description of a method of carrying the invention into effect is intended only as an example, and the invention is here described as applied to a thermo-electric recording pyrometer.

The pyrometer index is arranged to swing in a horizontal plane over an inked marking ribbon located above a horizontal edge or ridge over which the chart runs. A depressor bar located above the index and parallel to the horizontal ridge is operated by a cam rotated by an auxiliary power, such as a clock or electric motor, and is caused to fall periodically so as to force the index downward to cause the inked ribbon to mark the chart at the position of the intersection of the index and the horizontal ridge. Parallel to the horizontal ridge, and on the same level but nearer to the axis of the pyrometer movement is located a flat support bar, which is just touched by the index when it is forced fully down by the depressor bar. A frame, adapted to be periodically raised and lowered by a cam, is located over the index and carries a carriage which may be adjustable spaced along it in a direction parallel to the flat bar. The carriage carries a pivoted tongue which extends obliquely downward, and, when the pointer is not in a position to be engaged, is adapted to just miss the inner edge of the support bar when the frame is moved downward. If, however, the index is in a position to intercept the tongue, the latter, owing to the oblique angle at which it stands, is moved through an angle, the edge which contacts the index sliding forward at the same time to a position over the support bar. Associated with the tongue are electrical contacts for the control of the heating quantities, the contacts being so adjusted that they are not forced into engagement until the edge of the tongue has slid forward to the position over the support bar, so that no couple is exerted on the index.

In operation, at every cycle of operation, the depressor is first allowed to fall to mark the chart. The frame carrying the tongue is then lowered, and, if the index does not intercept the tongue the electrical contacts are not disturbed. If, however, the temperature condition is such that the index intercepts the tongue, the latter is moved through an angle and the electrical contact is changed, the index then being supported by the support bar at the point where it is engaged by the tongue. The temperature at which control is to be effected is set by moving the carriage carrying the tongue to the appropriate position. The control of the heating medium is effected by electrical relay mechanism operated from the electrical contacts.

In order that the preceding description may be better understood I will now proceed to describe the invention in relation to the accompanying drawing which shows, by way of example, the application of the invention to a thermo-electric recording pyrometer.

In the drawing:

Fig. 1 is a plan view of the apparatus.

Fig. 2 is an elevation of the said apparatus viewed in the direction of the arrow A.

Fig. 3 is an elevation of the said apparatus viewed in the direction of the arrow B.

Fig. 4 is a detail.

Fig. 5 is a diagram of connections.

The side plates 1 and 2 of a recording pyrometer carry the usual record chart driving mechanism appertaining to instruments of the type, but as such mechanisms form no part of the present invention they have been omitted from the drawing. Over a horizontal knife edge 3 and in a plane parallel to the said knife edge, an index or boom 4 of a temperature responsive element pivoted at 5, is normally free to move in response to the temperature to be controlled. An auxiliary power, such as a clock or an electric motor, drives a record chart 6, the chart passing from the roll 7, over the knife edge 3 and the curved guide plate 8 and thence downward into a space in which it accumulates. An inked marking ribbon 9 lies across the record chart above and parallel to the knife edge 3. Located above the index 4 and parallel to the knife edge is a depressor bar 10 carried by the spindle 11 with bearings 12 and 13 in the side plates 1 and 2 respectively. An extension of the spindle 11 through the bearing 13 carries a follower 14 contacting with the periphery of a cam 15 carried by a spindle 16 rotated by the auxiliary power in the direction indicated by the arrow. The periphery of the cam 15 is shaped so as to allow the follower 14 and with it the depressor bar 10 to fall under the action of gravity or of a spring, once during each revolution of the said cam, thus periodically forcing the index 4 downward into contact with the marking ribbon 9 causing the said ribbon to mark the record chart at the point of intersection of the index 4 and the knife edge 3 and holding the index in contact with the ribbon for an interval of time.

Located above the depressor bar 10 and secured to a spindle 17 having bearings 18 and 19 in the side plates 1 and 2 respectively, is a frame comprising two side members 20 and 21 and a tie rod 22, the latter preferably being of circular cross section. A downward extending arm 23 of the side member 21 carries at its lower end a roller 24 adapted to contact with the periphery of a cam 25 also carried by the spindle 16, the shape of the periphery of the said cam being such as to allow the frame carried by the spindle 17 to slowly fall under the action of gravity or of a spring once during each revolution of the said cam. Being secured to the same spindle, the cams 15 and 25 rotate at the same speed and in the same direction and they are so angularly positioned on the said spindle with respect to one another that the cam 15 allows the depressor bar 10 to fall a short interval of time before the frame secured to the spindle 17 is allowed to fall by the cam 25.

A threaded spindle 26 having bearings 27 and 28 in the side members 20 and 21 respectively, carries a threaded nut 29 to which are attached two forked arms 30 and 31, the arms engaging and extending beyond the tie rod 22 to prevent rotation of said nut. A knurled knob 32 carried by an extension of the spindle 26 through the bearing 28 provides means for rotating said spindle to axially position the nut 29 along the spindle. The extreme ends of the forked arms 30 and 31 are adapted to engage with and position a carriage 33 carried by and capable of axial movement along a spindle 34, preferably of D or square cross section with bearings 35 and 36 in the side members 20 and 21 respectively. The carriage 33 separately illustrated by Fig. 4 comprises a block 37 in which is a hole 38 of suitable size and shape to permit axial movement of the block along the spindle 34 without rotation thereon and a tongue piece 39 secured to the said block which extends obliquely downward and which also has an upward extension forming an index registering with a suitable scale of temperature marked upon a scale plate 40 located above and parallel to the spindle 34. A wire or other suitable stop 41 attached to the block 37, prevents the index 4, which moves in the direction from left to right as seen in Fig. 1 in response to an increase in the temperature to be controlled, from passing from under the tongue piece 39 in response to a rising temperature. Parallel to and with its upper face on the same level as the knife edge 3 but nearer to the axis 5 of the temperature responsive element is located a flat support bar 42, the position of said bar being such that when the frame secured to the spindle 17 falls, which takes place while the index 4 is held in contact with the ribbon 9 by the depressor bar 10, the leading edge of the tongue piece 39 just misses and passes behind the inner edge of the bar 42, unless the said index is held in a position so as to intercept the tongue, when the latter by reason of its obliquity is moved through an angle, partially rotating the spindle 34 and at the same time sliding forward to a position over the support bar.

An arm 43 carried by an extension of the spindle 17 beyond the bearing 18 in the side plate 1 has secured to it a block 44 of insulating material such as ebonite, carrying contact arms 45 and 46 terminating in contacts 47 and 48 respectively. The spindle 34 extends beyond the bearing 35 in the side member 20 and terminates in a hub 49 of insulating material to which is attached a contact arm 50 carrying a contact 51 interposed between the contacts 47 and 48 and normally contacting with the top contact 47 under the action of a light coiled spring 52 or other suitable means.

An insulating block 53 secured to the side plate 2 carries resilient contact arms 54 and 55 terminating in contacts 56 and 57 respectively, the contacts normally being open but adapted to be closed by the pin 58 projecting from the face of the cam 15, a short interval of time after the frame carrying the spindle 34 and the carriage 33 is allowed to fall and held in contact until the rotation of the said cam carries the pin out of contact with the arm 54 which occurs a short interval of time before the said frame is elevated, allowing the contacts 56 and 57 to open.

Suitable flexible connections 59 connect the contacts 47, 48 and 51 with insulated terminals 60 mounted on the side plate 1.

Fig. 5 shows how the contacts are connected with an electrical relay which controls the supply of heating medium, in which 61 is the relay operating coil, 62 a resistance to limit the current, 63 and 64 are pilot contacts and 65 and 66 contacts by the opening or closing of which the supply of heating medium is respectively decreased or increased.

To describe the operation of the apparatus let it be supposed that the temperature to be controlled is below the desired value and that the relay is not energized, so that the quantity of heating medium supplied is insufficient to cause the temperature to rise to the desired value and insufficient also to maintain the temperature at the desired value when the temperature is at this value. The index 4 assumes a position depending upon the temperature to be controlled. Once during each revolution of the cam 15 the depressor bar 10 falls forcing the index into contact with the marking ribbon 9 causing a mark to be made upon the record chart 6. The depressor bar is not raised immediately but maintains the index in contact with the marking ribbon. The frame carrying the spindle 34 and carriage 33 is then allowed by the cam 25 to slowly descend and because the temperature is by supposition less than the desired value the index 4 does not intercept the tongue piece 39 which passes behind the support bar 42, the contacts 47 and 51 remaining closed under the action of the spring 52. The pin 58, rotating with the cam 15, closes the contacts 56 and 57 allowing current to flow through the relay coil 61. The armature 67 is drawn into the relay coil as soon as the coil is energized closing the contacts 63 and 64, which allows current to flow from the supply to the relay coil without passing through the contacts 47, 51 and 56, 57, and contacts 65 and 66 increasing the supply of heating medium. After an interval of time the rotation of the cam carries the pin 58 out of contact with the contact arm 54 so that the contacts 56 and 57 open; but the relay remains energized by current flowing through contacts 63 and 64. The frame carrying the carriage 33 is raised by the cam 25 as soon as the contacts 56 and 57 open and the depressor bar 10 is then raised by the cam 15 this completing one cycle of operation. This cycle of operation continues to be repeated (but now the closing of contacts 56 and 57 during each cycle has no further effect) until as a result of the increased supply of heating medium the temperature to be controlled increases until it reaches such a value that the index 4 moving in response to the temperature intercepts the tongue piece 39 when the frame carrying the carriage 33 is being lowered. When this occurs the edge of the tongue piece contacting with the index slides forward to a position over the support bar and in so doing rotates the spindle 34 in its bearings 35 and 36, transferring the contact 51 to the contact 48. Then when the contacts 56 and 57 are closed by the pin 58, the relay coil 61 is short circuited and the armature is released opening the contacts 63, 64 and 65, 66. The opening of the latter pair of contacts reduces the supply of heating medium. When the contacts 56 and 57 open in the manner previously described and the frame carrying the carriage 33 rises, the spring 52 returns the contact 51 into contact with contact 47 but the relay is not thereby energized as the contacts 56 and 57 are open. The apparatus continues in operation without again operating the relay until the temperature falls below the desired value, when the apparatus operates to increase the supply of heating medium as has been previously described. The apparatus may be set to control the temperature at any value within the range of the apparatus by rotating the knob 32 until the upward extension of the tongue piece forming an index registers with the desired temperature calibrated on the scale plate 40.

Having now particularly described and ascertained the nature of my invention, and in what manner the same is to be performed, what I claim is:

1. In a control instrument, the combination with a condition sensitive index, of an intermittently operating control member including a part dipping into the path of the index and adapted to be limited in its dipping movement when intercepted by the index, and means for supporting the index when intercepted by the part to prevent a couple being exerted on the index.

2. In a control instrument, the combination with a condition sensitive index having a support for the forward end thereof, of a control member beating across the path of the index to the rear of the support and adapted to be limited by the index in certain position of the latter, and a second support, to the rear of the first support, for the index when engaged by the member to carry the load of the member during its control operation.

3. In an electrical instrument, the combination of a movable pointer, a support for the anterior end of the pointer, a depressor bar pivoted to engage the pointer and hold the same against the support, a second support, a pivoted control mechanism including a part dipping across the path of the pointer in proximity to the second support and adapted when intercepted by the pointer to move along the pointer until over said second support so that the pressure thereof is carried by said support and means for periodically actuating said depressor and control mechanism.

4. In an electrical instrument, the combination of a pointer movable in a plane, two spaced apart supports above which the pointer freely swings, an intermittently operated depressor which presses the pointer against one of said supports, control means beating across the path of the pointer adjacent the other support, said means including an element adapted to coact with the pointer in certain positions thereof thereby limiting movement of said means, said element when contacting with the pointer adapted to move therealong until over the support whereby the pressure of the means is exerted on the support and means for operating said depressor and control means.

5. In an instrument of the type described, the combination of a movable member responsive to a condition, a support located closely adjacent to and parallel to the plane of movement of said member, and an oscillating means including a part beating across the plane of the index closely adjacent said support and adapted to coact with the index in certain positions thereof, said part adapted, when coacting with the index, to ride therealong until co-incident with the support when its movement is arrested and the pressure exerted thereby is sustained by the support.

6. An instrument having, in combination, an index deflectable in a plane, a bar located closely adjacent to and parallel to said plane and an oscillatable control member including a finger movable into and out of the plane of the index and in proximity to said bar and adapted to coact with the index in certain positions thereof, said finger pivoted to said member for limited pivotal movement and adapted, when coacting with the index, to slide therealong until opposite the bar whereupon downward movement of the control member is arrested and the pressure exerted on the index is carried by the bar.

7. An instrument having, in combination, a movable index, a support closely adjacent said index and above which the index freely moves, and an oscillatable control means including a part pivoted thereon for limited movement and dipping into the path of the index closely adjacent said support, said part adapted to coact with the index in certain positions and when coacting therewith to ride therealong until above support, whereby the pressure exerted by the part in performing a control operation is carried by the support.

8. An instrument having, in combination, a movable index, a frame, a scale plate carried thereby, a support bar carried by said frame and located closely adjacent to said index but normally out of contact therewith, an oscillatable means mounted in said frame and a lever pivotally supported on said means so that one end thereof cooperates with said scale to indicate the position thereof and the other end dips across the path of the index and coacts therewith in certain positions thereof to limit movement of said means, said end of the lever, when coacting with the index, sliding therealong until opposite said bar, whereupon the other end thereof contacts with said scale to limit further movement along the index and the pressure exerted thereby is carried by the support.

9. In a control instrument, the combination with a meter pointer, of an intermittently operating control member adapted to dip across the path of the pointer and to coact with the pointer in certain positions thereof, a support for said pointer during its coaction with the member, and means for causing said support and member to directly oppose each other during the coaction of the pointer and member to prevent the formation of a couple on the pointer.

In testimony whereof I affix my signature.
JAMES BRIDGES.